Figure 1:
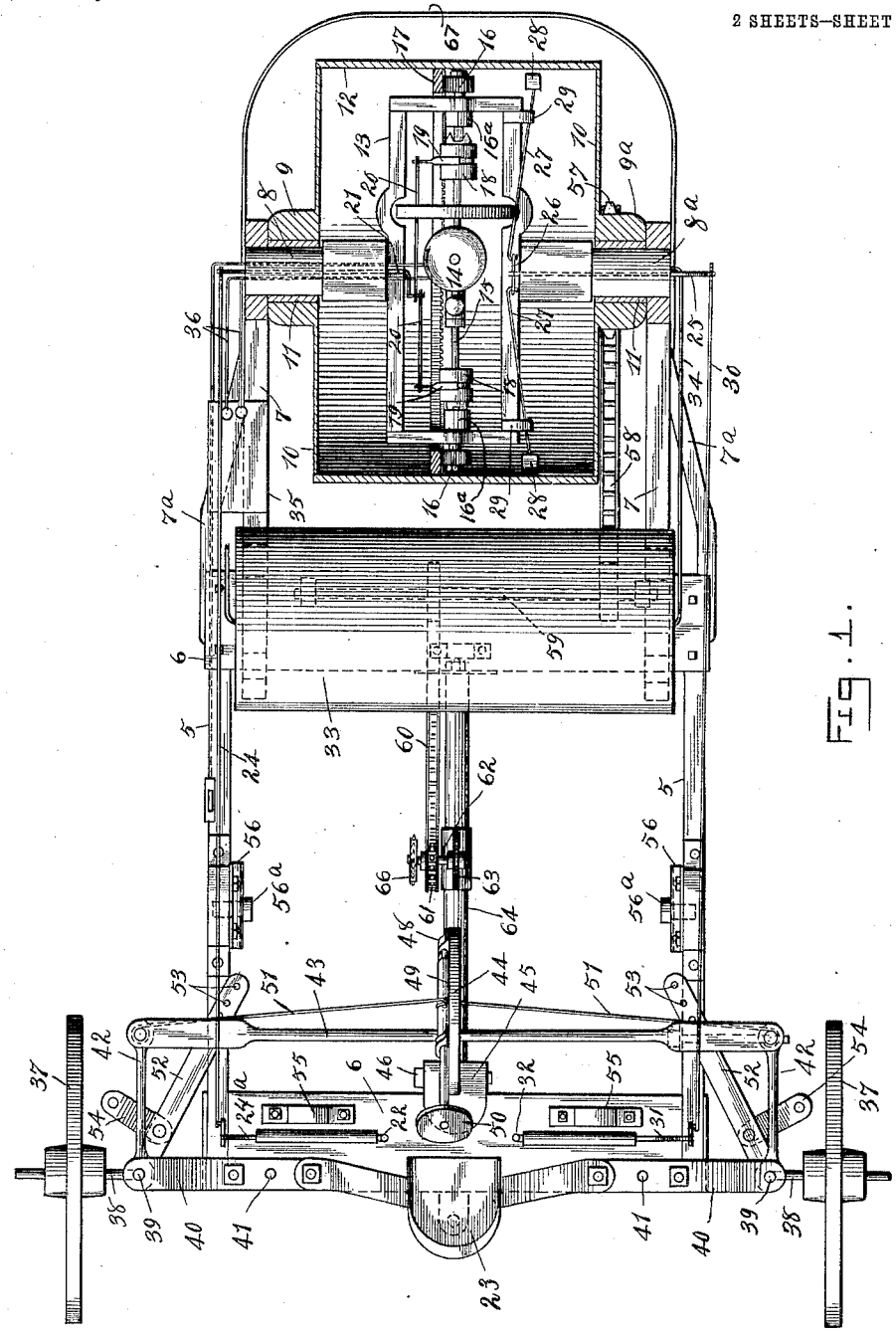

J. W. McLAIN.
TRACTION APPARATUS.
APPLICATION FILED APR. 24, 1911.
1,098,675.
Patented June 2, 1914.
2 SHEETS—SHEET 2.
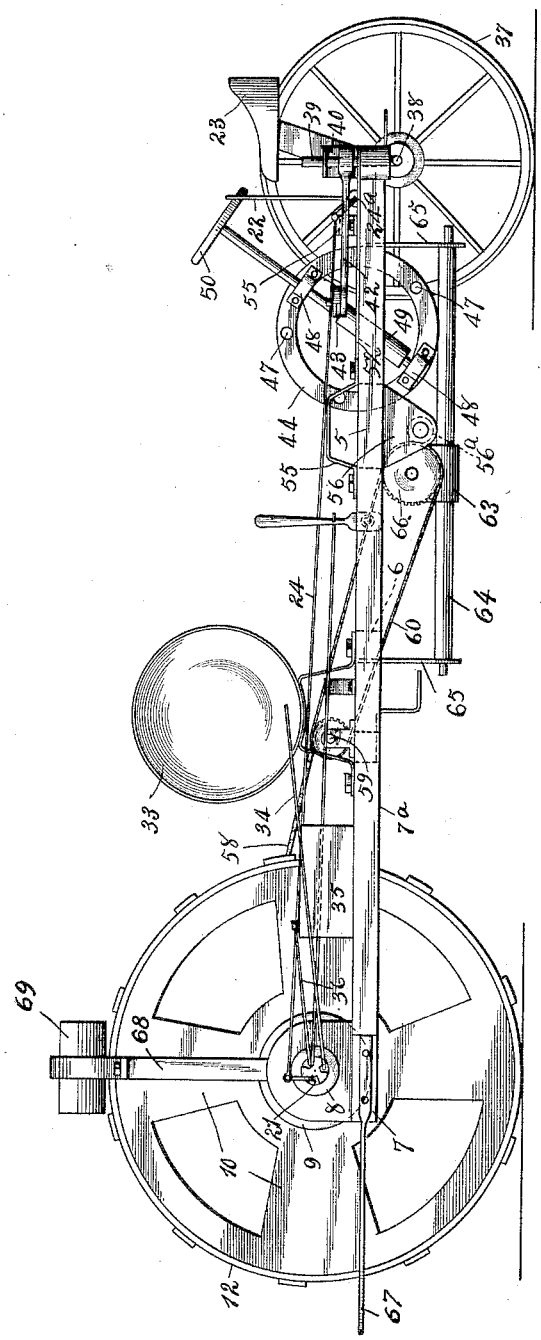
Fig. 2.
Witnesses
Chas. F. Bassett
M. A. Milord

UNITED STATES PATENT OFFICE.

JOHN W. McLAIN, OF CROOKSTON, MINNESOTA.

TRACTION APPARATUS.

1,098,675.  Specification of Letters Patent.  Patented June 2, 1914.

Application filed April 24, 1911. Serial No. 622,868.

*To all whom it may concern:*

Be it known that I, JOHN W. McLAIN, citizen of the United States, residing at Crookston, in the county of Polk and State of Minnesota, have invented certain new and useful Improvements in Traction Apparatus, of which the following is a specification.

My invention relates to traction motors and has especial reference to apparatus adapted for both stationary and traction purposes.

The chief object of the improvements which constitute the subject matter of this application for patent is to provide a motor vehicle that will be especially adapted to farm use, the construction adapting the machine to have a variety of agricultural implements attached thereto for traction purposes or operatively connected with stationary machinery employed for the different operations required in farm work so that the contrivances can in this way be effectively and economically placed in service without requiring the use of horses for any purpose connected therewith. In order to accomplish this paramount result, various minor objects are kept in view in the designing and practical construction of the motor and its carriage, one such object being the novel arrangement of the engine or motor with relation to the single traction wheel employed. This wheel is made in the form of a hollow cylinder or drum, mounted to rotate upon a fixed axle. The motor may be of any approved type, the preferred form being that of an explosive engine, provision being made for transmitting motion to the drum or wheel by suitable gearing which connects the engine shaft with a gear mounted upon the inner surface of the drum, thus advantageously applying the power.

Another object is to provide a hollow axle upon which the traction wheel rotates and through which the necessary pipes and connecting rods are transmitted to the interior of the wheel or drum casing.

A further object is to provide a powerful and quick-acting brake, which is under the control of the operator and by means of which the speed of the drum can be efficiently regulated when the apparatus is employed for hoisting purposes, for which it is especially adapted.

Another very important feature of my invention lies in the reversing mechanism, by means of which the direction of movement of the drum can be readily changed. This device is also arranged so that the operator while in his seat will have complete control of the traction means while at the same time he will be convenient to the steering gear.

Another object is to provide a steering wheel frame that will permit of a wide range of adjustment, thus allowing the wheel to be varied in its relation to the seat of the operator.

A further object is to provide means for varying the distance between the line of tread of the rear supporting wheels for the purpose of accommodating the apparatus for the attachment of implements of different dimensions, this feature being particularly useful when it is desired to attach gangs of plows to the frame. This appliance is of great advantage when it is necessary to apply a motive power to the independent machinery of apparatus which is being drawn over the field, and is especially useful to run the mechanism of grain binders and other similar implements.

Another object is to provide means for attaching a machine to the front of the machine, in which case the traction apparatus may be driven ahead, or the reversing mechanism brought into play and the apparatus run backward, according to the nature of the machine attached and the work it is to do.

A further object is to provide suitable friction clutches between the motor and the traction drum or wheel, connected by rods to a lever near the operator's position, so that the direction of movement can be reversed or the power entirely cut off from the wheel to stop the machine.

Another object is to adapt the apparatus to be used for hoisting, which is of considerable advantage in handling hay or grain when storing in the barn or stacking in the open.

Another object is to apply the power to advantage, which is done by making its application at the rim of the wheel, through a simple gear attachment thus avoiding the excessive friction and loss of leverage which results from applying the power through intermediate gearing.

A further object is to provide a housing for the engine and gearing thus protecting the more important bearings and mobile parts from dust and dirt, this being an important feature in machines designed for farm use since they are exposed to an unusual amount of dust, chaff and debris from the grain or other substances dealt with.

I accomplish the desired results by employing the apparatus illustrated in the accompanying drawings which form a part of this application, the details of construction being disclosed in the following views.

Figure 1 is a top plan view of my improved farm traction motor, and Fig. 2 is a side elevation, with the near steering wheels removed.

Referring to the details of the drawing, the numeral 5 indicates the side members and 6 the cross bars of rectangular frame, disposed horizontally, and adapted to support the various mechanisms. Projecting forward from this main frame are two parallel beams 7, rigidly braced by members 7$^a$ to form supports for the ends of a fixed axle, made in two hollow alining sections 8, 8$^a$. These axle sections form bearings for hubs 9, 9$^a$, which support spokes 10, sleeves 11 being interposed between the hubs and axle sections. The outer ends of the spokes 10 are connected by a broad rim 12 which forms the tread of the wheel and from its breadth renders the construction similar to a drum and affords an advantage in certain kinds of work as when the motor is traversing cultivated ground. The openings between the spokes may be closed in by plates or canvas screens (not shown) to exclude dust if desired. The said axle sections extend within the cavity of the drum and are connected by a horizontal rectangular frame 13, having its ends extending nearly to the inner surface of the drum rim. Upon this frame is mounted a motor 14, which may be an engine of any approved type. The motor shaft 15 extends transversely to the axis of the wheel or drum, its ends being projected so that they are in close proximity to the inner surface of the rim 12. Each end of the shaft carries a pinion 16, which is in mesh with a ring gear 17, attached to the interior face of the rim. These pinions are loosely mounted on the engine shaft, and are connected to clutch sleeves 18, splined on said shaft so that they turn therewith, at the same time having a sliding movement. These clutches are adapted to engage collars or hubs 16$^a$ attached to the pinions, and are operated in the manner usual in clutch devices, by means of forks 19, connected by link rods 20 with a rock-shaft 21, which passes out through one of the hollow axle sections; and is adapted to be operated by means of a lever 22, placed near the operator's seat 23, near the rear of the main frame, connections to the said lever being made by means of a rod 24 and crank shaft 24$^a$. It will be readily understood that the clutch sleeves 18 are so arranged in relation to the gear collars 16$^a$ that only one clutch at a time will be in mesh and when brought to the middle point of their throw both pinions will be out of gear with the engine shaft, so that the drum may be quickly and easily started, reversed and stopped by operating the lever 22. It is desirable to use the drum for hoisting, in the manner hereinafter described, and when put to this purpose it is necessary to have some means for controlling the rate of speed in a positive manner, especially when comparatively heavy loads are lifted, as in stacking hay. To accomplish this with ease and rapidity I provide a double acting brake, comprising a rock-shaft 25, passing through the axle section 8$^a$, and having a cross arm 26, connected through brake rods 27 with brake shoes 28 arranged adjacent the interior face of the rim 12. The rods 27 pass through bearings 29 on the frame 13, and the outer end of the said rock-shaft 25 is connected by means of a link rod 30 with another rock-shaft 31, having an operating lever 32 arranged near the seat 23, as in the case of the clutch lever 22. Directly behind the traction wheel is located a water supply tank 33, from which a pipe 34 leads through the axle section 8$^a$. At any convenient point on the frame, is located a battery casing 35, in which a battery may be installed when electricity is employed for motive power or an explosive engine is in use. The wires from the battery are led through tubes 36 to the motor.

The rear end of the main frame is supported upon ground wheels 37, independently mounted so that they can be used for steering or guiding. These guide wheels are journaled on spindles or axles 38 extending at right angles from vertical posts 39, pivotally mounted on bracket members 40, which are pierced by a series of spaced holes 41, which allow the said brackets to be adjusted to vary the distance between the posts 39, which is desirable when machines of unusual width are to be attached to the frame. Extending laterally from the posts 39 are operating arms 42, connected by a link bar 43, so that the spindles 38 will always be at the same angle of inclination relatively to the frame. The bar 43 passes through a windlass ring or frame 44, which is mounted in a suitable slot in a bracket 45 attached to the cross bar 6 of the frame. The ring is adjustably secured in the said bracket by a bolt 46 which is adapted to engage a series of holes 47 arranged at spaced intervals in said ring. Mounted in boxes or bearings 48 on the side of the ring 44 is a windlass 49, carrying upon one end of its shaft a steering wheel 50. Extending between the ends of the arms 42 of the posts 39 is a cable 51, secured at the middle to the windlass 49 about which it is given several turns. It will be readily seen that by operating the wheel 50 the opposite portions of the cable 51 will be alternately wound and unwound upon the windlass, thus turning the arms 42 through equal angles of arc, and bringing the wheel spindles 38 to the desired inclination for guiding the machine.

In order to facilitate the attachment of the various implements in common use in agricultural work I provide various devices mounted at suitable points upon the frame and adapted to removably secure such tools in operative position. Thus, near the rear of the machine are disposed attachments for a gang of plows. These devices are duplicated upon opposite sides of the frame so that the plows can be used upon either hand, and consist of flat bars 52, having a hole at one end through which the adjacent post 39 passes, and the other end of the bar is supplied with a series of spaced holes 53, and rests upon the frame member 5 where it is secured by suitable bolts. Pivoted to the said bar is a link or clevis 54 to which the implements are attached. Upon the rear cross beam 6 and the side members 5 of the frame are arranged brackets 55, 55, which serve to attach a two-row corn cultivator, the wheels of the tool having been first removed therefrom. Depending from the sides 5 upon either hand are brackets 56, provided with suitable boxes 56ª to receive the ends of the axle of a corn planter, wheel scraper, or other similar machine having a transverse axle. In case such an implement is so attached, its ground wheels, of course, must be first removed to permit the axle to engage the boxes 56ª in the manner stated. When the device so attached has operative mechanism I supply the necessary power for moving the machinery by an arrangement of shafting and gears as follows:—The hub 9ª of the traction wheel is provided with a sprocket 57 which is connected by a chain 58 with a shaft 59, arranged transversely to the frame immediately to the rear of said wheel. A chain 60 connects a sprocket on this shaft with a sprocket 61 carried by a stub shaft 62 supported in a bracket 63 adjustably mounted on a fixed shaft 64 arranged longitudinally in the median line and is supported at the ends in hangers 65 depending from the under side of the main frame. The sprocket 61 has a companion gear or sprocket 66 from which connection may be made to the machinery to be operated, such connecting gearing not being shown as it will be varied to meet the special conditions with each machine attached. The bracket 63 can be slid along the shaft 64 to any required position to suit the device in use, in which case the belt or chain 60 must necessarily be correspondingly lengthened or shortened. Extending from the sides of the frame in front of the drum is a bail 67 which affords an attachment for a vehicle, or machine which is furnished with ground wheels, and arching over the said drum is a frame 68 upon which is mounted a gasolene supply tank 69, which will be necessary when a gasolene motor is used.

The operation of the above described traction apparatus described in a general way is as follows:—The required implement having been attached in the proper place to the frame, if it is desired to move the machine forward as in plowing, the operator takes his seat and by manipulating the clutch lever controls the direction of travel, or throws the pinions 16 entirely out of gear in the manner previously described according to the work in hand. When it is desired to use the machine as a stationary engine the front end of the frame is blocked up so as to raise the drum clear of the ground. If the work done is hoisting, a suitable rope or cable is wound upon the drum, and by manipulating the clutch lever the drum or wheel can be turned alternately in opposite directions or stopped, according to the requirements.

Having thus described my invention, what I claim as new, is:—

1. In a traction apparatus, the combination with a frame, of a drum journaled in said frame and supporting one end thereof, an annular gear on the inner periphery of said drum, a motor arranged within said drum, operative connection between the motor and said gear, a brake arranged within the drum, guide wheels independent of said motor and adapted to support the other end of the frame, and means for varying the distance between said guide wheels.

2. In a traction apparatus, the combination with a main frame, a hollow axle in said frame, a drum mounted on said axle, and supporting one end of said frame, a gear on the inner periphery of said drum, a motor arranged within said drum, operative connection between the motor and the internal gear of the drum, means for conveying fuel to said motor through said hollow axle, a brake arranged within said drum, and adjustable guide wheels supporting the other end of the main frame.

3. In a traction apparatus, the combination with a frame, of a hollow axle mounted on said frame, a drum journaled on said axle and supporting one end of said frame, a motor arranged within said drum, operative connection between said motor and the drum, means for conveying motive fluid to said motor through said axle, guide wheels supporting the other end of said frame, means for controlling said wheels, a countershaft on said frame and operative connection between said shaft and the drum.

4. In a traction apparatus the combination with a frame, of a hollow axle fixed on said frame, a drum rotatably mounted on said axle, a motor carried on said axle within the drum, operative connection between the motor and the drum, said connection comprising a ring gear mounted on the inner face of the drum rim, loose pinions mounted upon the ends of the motor shaft, clutches adapted to engage said pinions, means for operating said clutches, and a brake adapted to engage the rim of said drum.

In testimony whereof I affix my signature in the presence of two witnesses.

JOHN W. McLAIN.

Witnesses:
  E. BERTELSON,
  DAVID HUGGARD.